(No Model.)

G. NORWOOD.
Float for Fishing Seines or Nets.

No. 241,150. Patented May 10, 1881.

Witnesses.
S. N. Piper
E. Pratt

Inventor.
George Norwood,
by R. H. Eddy atty.

N. PETERS, Photo-Lithographer, Washington, D. C.

UNITED STATES PATENT OFFICE.

GEORGE NORWOOD, OF GLOUCESTER, MASSACHUSETTS.

FLOAT FOR FISHING SEINES OR NETS.

SPECIFICATION forming part of Letters Patent No. 241,150, dated May 10, 1881.

Application filed February 18, 1881. (No model.)

*To all whom it may concern:*

Be it known that I, GEORGE NORWOOD, of Gloucester, of the county of Essex and State of Massachusetts, have invented a new and useful Improvement in Floats for Fishing Seines or Nets; and I do hereby declare the same to be described in the following specification and represented in the accompanying drawings, of which—

Figure 1:
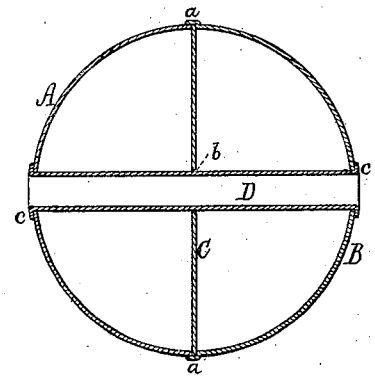
Figure 2:
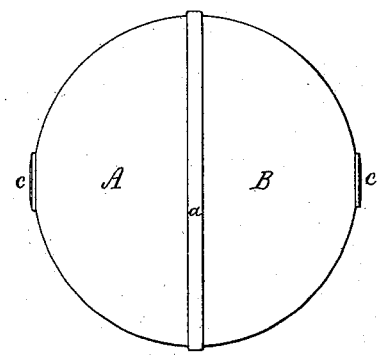
Figure 3:
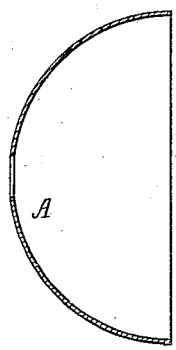
Figure 5:
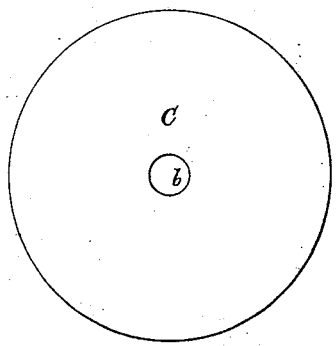
Figure 4:
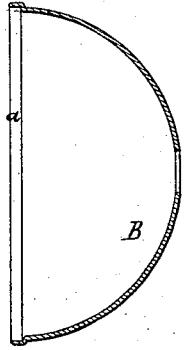

Figure 1 is a transverse section, and Fig. 2 a side view, of a float of my improved kind. Figs. 3 and 4 are sections of the hemispherical cups constituting the body of the float. Fig. 5 is a view of the perforated disk or strengthening-partition.

The float in question is composed of two cups, (hemispherical, by preference,) a perforated disk or partition, and a tube arranged and applied substantially as hereinafter described.

In the drawings, A and B are the two metallic hemispherical cups, one of which is rabbeted or flanged, as shown at *a a*, to receive the transverse partition C, and the other of said cups in manner as represented in Fig. 1. The said transverse partition is a disk or circular plate of metal having a circular hole, *b*, at its central part, such hole being concentric with the circumference of the disk, and of a diameter equal to that of the tube D, which is to be of metal and to go through the partition, and also through the two cups at the crowns of the latter, and is to be there soldered to the cups, it being flanged or upset upon the cups in manner as shown at *c*.

In making the float I usually place the tube and the partition in their relative positions in the flanged cup and solder the partition at and around its periphery to the cup, and also at and around the periphery of the hole *b* to the tube. I also solder the tube to the cup at the crown of the latter. Next, I apply the other cup to the tube and the flanged cup, and upset the end of the tube upon the unflanged cup, after which I solder the two cups together, and the unflanged cup to the tube, taking care to have all the joints air-tight.

Instead of making the float spherical in form it may be ellipsoidal or oval. Floats so made are very strong and not easily crushed or liable to leak, and can be strung upon the bolt-rope of the seine or net, it going through their tubes. They are far superior to wooden or glass floats, as they are not easily broken, and may readily be constructed air-tight, and do not, like a wooden float, absorb water.

Each cup I usually make of metal plate, struck into form by dies.

I am aware that a seine-float composed of a hollow vessel and a tube extending through it axially is not new, both vessel and tube being composed of vulcanized india-rubber, and therefore being an elastic or yielding float. I am also aware that two hollow hemispheres hinged together have been strengthened by a ring placed in each, to all of which I make no claim. Such a ring is no equivalent for the disk of my improved inelastic float, as such, besides serving with the tube to strengthen the float so as to prevent it from being crushed, aids in forming in it two separate air-tight chambers, either of which will serve to buoy the float in case of a leaking taking place in the other.

I claim as my invention—

The fishing seine or net float constructed substantially as shown and described—viz., of the tube D, the transverse partition C, and the two cups A and B, one of which is flanged or rabbeted to receive the other, and the partition, all being arranged and combined essentially as set forth.

GEORGE NORWOOD.

Witnesses:
R. H. EDDY,
E. B. PRATT.